United States Patent
Morlet Ugalde et al.

(10) Patent No.: US 12,233,769 B2
(45) Date of Patent: Feb. 25, 2025

(54) FLOOR MAT FOR A VEHICLE

(71) Applicant: Ford Global Technologies, LLC, Dearborn, MI (US)

(72) Inventors: Gian Carlo Morlet Ugalde, Huixquilucan (MX); Jedidiah Paul Durkin, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 308 days.

(21) Appl. No.: 17/837,506

(22) Filed: Jun. 10, 2022

(65) Prior Publication Data
US 2023/0398919 A1 Dec. 14, 2023

(51) Int. Cl.
*B60N 3/00* (2006.01)
*B60N 3/04* (2006.01)
*B60N 3/06* (2006.01)

(52) U.S. Cl.
CPC ............ *B60N 3/046* (2013.01); *B60N 3/048* (2013.01); *B60N 3/063* (2013.01)

(58) Field of Classification Search
CPC ......... B60N 3/046; B60N 3/048; B60N 3/063
See application file for complete search history.

(56) References Cited

U.S. PATENT DOCUMENTS

| | | | |
|---|---|---|---|
| 3,059,960 A * | 10/1962 | Komorowski | G05G 1/40 296/75 |
| 4,984,838 A | 1/1991 | Kim | |
| 7,556,307 B2 | 7/2009 | Ohtsubo et al. | |
| 9,821,697 B2 | 11/2017 | Jaradi et al. | |
| 9,994,140 B2 | 6/2018 | Makowski et al. | |
| 2013/0038107 A1 | 2/2013 | Tamura et al. | |
| 2013/0277941 A1 | 10/2013 | Ryan et al. | |
| 2017/0072816 A1 | 3/2017 | Lippman et al. | |

(Continued)

FOREIGN PATENT DOCUMENTS

| | | |
|---|---|---|
| CN | 203720716 U | 7/2014 |
| CN | 105383348 A | 3/2016 |
| CN | 105383350 A | 3/2016 |

(Continued)

OTHER PUBLICATIONS

Ultra-thin Slim Tablet Case for iPad mini, aliexpress.com/item/33019364672.html, accessed Feb. 15, 2022, 1 page.

*Primary Examiner* — Steven O Douglas
(74) *Attorney, Agent, or Firm* — Vichit Chea; Price Heneveld LLP

(57) ABSTRACT

A floor mat for a vehicle includes a first panel, a second panel pivotably coupled to the first panel, and an actuator operably coupled to and positioned beneath the first panel. The actuator is operable to move the first panel in a vehicle-forward direction from a first position to a second position. Movement of the first panel toward the second position causes the second panel to pivot relative to the first panel from a lowered position to a raised position. In the lowered position of the second panel, the vehicle-uppermost portion of the second panel is positioned at a first vehicle-elevation. In the raised position of the second panel, the vehicle-uppermost portion of the second panel is positioned at a second vehicle-elevation that is greater than the first vehicle-elevation.

20 Claims, 7 Drawing Sheets

(56) References Cited

U.S. PATENT DOCUMENTS

2023/0356640 A1* 11/2023 Kleindl ................... B60N 3/06

FOREIGN PATENT DOCUMENTS

| CN | 207523493 U | 6/2018 |
| CN | 110155343 A | 8/2019 |
| DE | 102004021362 A1 | 11/2005 |
| DE | 102006006362 A1 | 5/2007 |
| DE | 102018218508 A1 | 4/2020 |
| EP | 1816056 A2 | 8/2007 |
| EP | 2781402 A1 | 9/2014 |
| FR | 2689081 A1 | 10/1993 |
| JP | 2006290351 A | 10/2006 |
| JP | 2008284901 A | 11/2008 |
| JP | 2008285088 A | 11/2008 |
| KR | 20140016530 A | 2/2014 |

* cited by examiner

FLOOR MAT FOR A VEHICLE

FIELD OF THE DISCLOSURE

The present disclosure generally relates to a floor mat for a vehicle. More particularly, the present disclosure relates to a floor mat that includes a plurality of panels configured to selectively form a footrest.

BACKGROUND OF THE DISCLOSURE

Vehicles often include floor mats. Floor mats are typically flat and do not provide a raised footrest for a vehicle occupant.

SUMMARY OF THE DISCLOSURE

According to a first aspect of the present disclosure, a floor mat for a vehicle includes a first panel, a second panel pivotably coupled to the first panel, and an actuator operably coupled to and positioned beneath the first panel. The actuator is operable to move the first panel in a vehicle-forward direction from a first position to a second position. Movement of the first panel toward the second position causes the second panel to pivot relative to the first panel from a lowered position to a raised position. In the lowered position of the second panel, the vehicle-uppermost portion of the second panel is positioned at a first vehicle-elevation. In the raised position of the second panel, the vehicle-uppermost portion of the second panel is positioned at a second vehicle-elevation that is greater than the first vehicle-elevation.

Embodiments of the first aspect of the present disclosure can include any one or a combination of the following features:
- the actuator comprises a linear actuator coupled to the first panel and operable to translate the first panel between the first and second positions;
- the actuator comprises a pull rope coupled to the first panel and configured to be pulled in a vehicle-rearward direction to move the first panel from the first position to the second position;
- a base panel positioned beneath the first and second panels, wherein the actuator is coupled to the base panel;
- a third panel pivotably coupled to the second panel and pivotably coupled to the base panel;
- movement of the first panel toward the second position causes the third panel to pivot relative to the base panel from a lowered position, wherein the vehicle-uppermost portion of the third panel is positioned at a third vehicle-elevation, to a raised position, wherein the vehicle-uppermost portion of the third panel is positioned at a fourth vehicle-elevation that is greater than the third vehicle-elevation; and
- the first panel is smaller than each of the second, third, and base panels.

According to a second aspect of the present disclosure, a floor mat for a vehicle includes a first panel having an underside, a retention feature coupled to the underside of the first panel, and a second panel pivotably coupled to the first panel. The first panel is operable between a first position and a second position vehicle-forward of the first position. Movement of the first panel toward the second position causes the second panel to pivot relative to the first panel from a lowered position to a raised position. In the lowered position of the second panel, the vehicle-uppermost portion of the second panel is positioned at a first vehicle-elevation. In the raised position of the second panel, the vehicle-uppermost portion of the second panel is positioned at a second vehicle-elevation that is greater than the first vehicle-elevation. Further, the retention feature is configured to be engaged with a portion of at least one of the floor mat and the vehicle to selectively maintain the first panel in the second position.

Embodiments of the second aspect of the present disclosure can include any one or a combination of the following features:
- the retention feature is configured to be engaged with a portion of the vehicle to selectively maintain the first panel in the second position;
- a base panel positioned beneath the first and second panels, wherein the retention feature is configured to be engaged with the base panel to selectively maintain the first panel in the second position;
- a third panel pivotably coupled to the second panel and pivotably coupled to the base panel;
- movement of the first panel toward the second position causes the third panel to pivot relative to the base panel from a lowered position, wherein the vehicle-uppermost portion of the third panel is positioned at a third vehicle-elevation, to a raised position, wherein the vehicle-uppermost portion of the third panel is positioned at a fourth vehicle-elevation that is greater than the third vehicle-elevation; and
- an actuator operably coupled to and positioned beneath the first panel, the actuator being operable to move the first panel in the vehicle-forward direction from the first position to the second position.

According to a third aspect of the present disclosure, a floor mat for a vehicle includes a first panel, a second panel pivotably coupled to the first panel, a third panel pivotably coupled to the second panel, and a base panel extending beneath the first, second, and third panels and being pivotably coupled to the third panel at a joint. The first panel is operable between a first position and a second position. In the first position of the first panel, the first panel is a first distance from the joint. In the second position of the first panel, the first panel is a second distance from the joint that is less than the first distance. Movement of the first panel toward the second position causes the second panel to pivot relative to the first panel from a lowered position to a raised position. In the lowered position of the second panel, the uppermost portion of the second panel is positioned at a first elevation. In the raised position of the second panel, the uppermost portion of the second panel is positioned at a second elevation that is greater than the first elevation.

Embodiments of the third aspect of the present disclosure can include any one or a combination of the following features:
- movement of the first panel toward the second position causes the third panel to pivot relative to the base panel from a lowered position, wherein the uppermost portion of the third panel is positioned at a third elevation, to a raised position, wherein the uppermost portion of the third panel is positioned at a fourth elevation that is greater than the third elevation;
- a retention feature coupled to an underside of the first panel and operable to be engaged with the base panel to maintain the first panel in the second position;
- an actuator operably coupled to and positioned beneath the first panel, the actuator being operable to move the first panel from the first position to the second position;

the actuator extends beneath at least a portion of the base panel;

the actuator comprises a pull rope that is coupled to the first panel and contacts the base panel such that pulling a tag end of the pull rope away from the joint causes the first panel to move from the first position to the second position; and the actuator comprises a linear actuator that is coupled to a motor and configured to translate the first panel from the first position to the second position.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
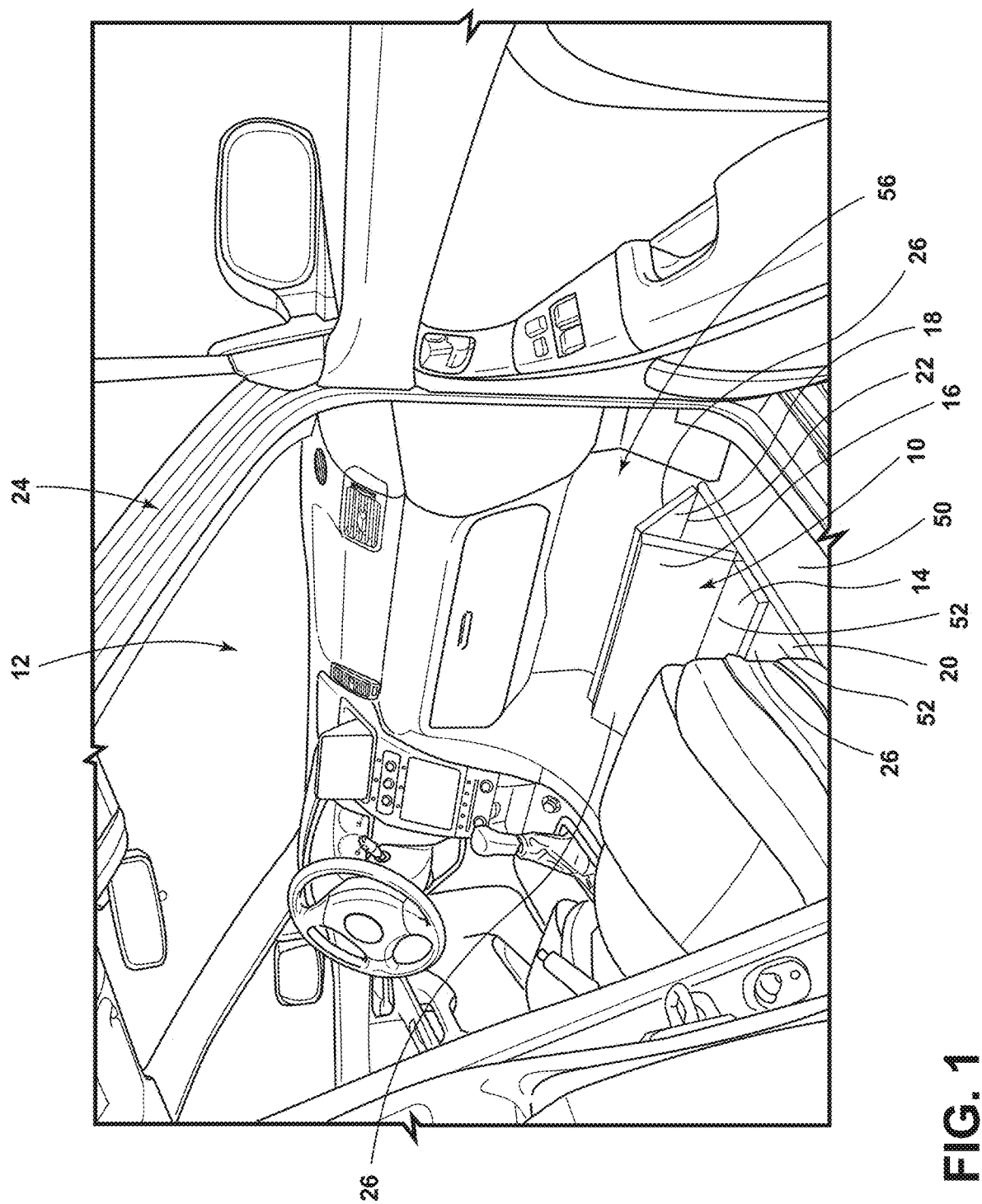
FIG. 1 is a perspective view of a vehicle, illustrating a floor mat disposed within a vehicle interior of the vehicle, according to one embodiment.

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as "first" and "second," "top" and "bottom," and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein, the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring now to FIGS. 1-12, a floor mat 10 for a vehicle 12 includes a first panel 14, a second panel 16 pivotably coupled to the first panel 14, a third panel 18 pivotably coupled to the second panel 16, and a base panel 20. The base panel 20 extends beneath the first, second, and third panels 14, 16, 18, and is pivotably coupled to the third panel 18 at a joint 22. The first panel 14 is operable between a first position, wherein the first panel 14 is a first distance from the joint 22, and a second position, wherein the first panel 14 is a second distance from the joint 22 that is less than the first distance. Movement of the first panel 14 toward the second position causes the second panel 16 to pivot relative to the first panel 14 from a lowered position, wherein the uppermost portion of the second panel 16 is positioned at a first elevation, to a raised position, wherein the uppermost portion of the second panel 16 is positioned at a second elevation that is greater than the first elevation.

Figure 3:
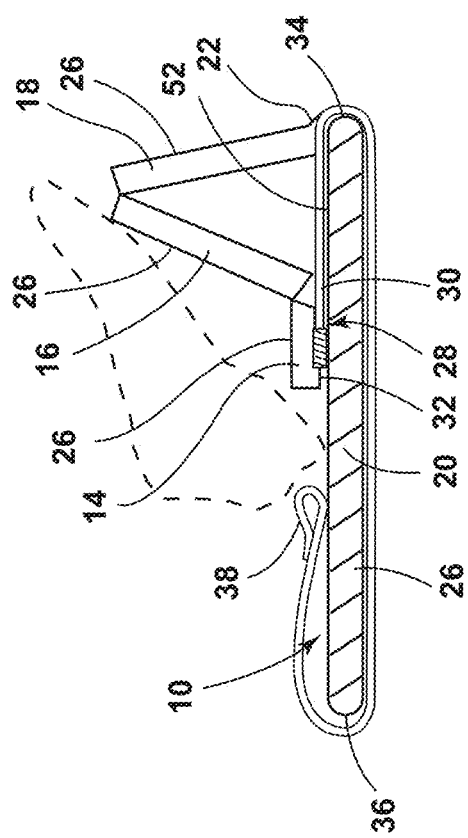
FIG. 3 is a side elevational view of the floor mat, illustrating the first panel in a second position, and the second panel in a raised position, according to one embodiment.
Figure 2:
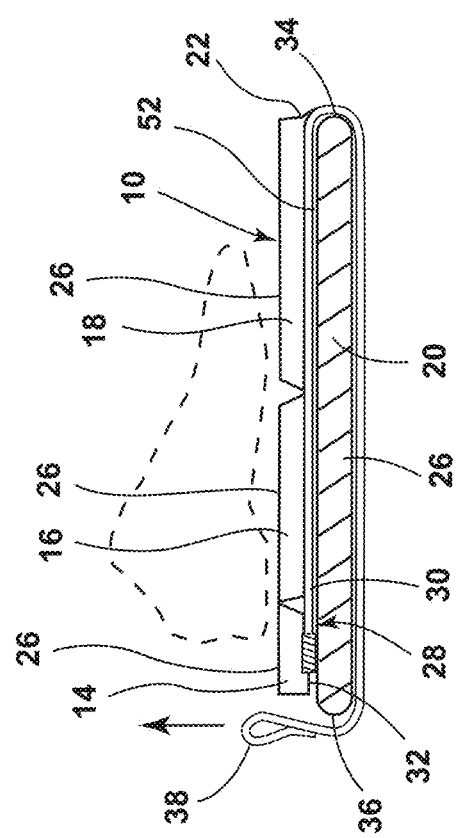
FIG. 2 is a side elevational view of a floor mat that includes a plurality of panels, illustrating a first panel in a first position, and a second panel in a lowered position, according to one embodiment.

Referring now to FIG. 1, the floor mat 10 is illustrated in a vehicle interior 24 of the vehicle 12. The floor mat 10 includes a plurality of panels 26. The plurality of panels 26 may be articulated relative to each other, such that the panels 26 may pivot relative to other panels 26 of the floor mat 10. In various embodiments, the floor mat 10 includes the first panel 14 and the second panel 16. The second panel 16 is pivotably coupled to the first panel 14. In some implementations, the floor mat 10 includes a third panel 18. The third panel 18 may be pivotably coupled to the second panel 16. As illustrated in FIGS. 1-3, the floor mat 10 can include the base panel 20. As illustrated in FIGS. 1-6, the base panel 20 can be positioned beneath the first and second panels 14, 16. In various embodiments, the base panel 20 extends beneath the first, second, and third panels 14, 16, 18, and is pivotably coupled to the third panel 18 at a joint 22. It is contemplated that the joint 22 may be one or more of a variety of types of connection features that allow the third panel 18 to pivot relative to the base panel 20. For example, the joint 22 may be a living hinge, a hinge, a flexible piece of material, and/or a combination thereof. Further, it is contemplated that the first, second, and third panels 14, 16, 18 may be pivotably coupled in the same fashion that the third panel 18 is coupled to the base panel 20 via the joint 22. As illustrated in FIGS. 2-6, the first panel 14 can be smaller than each of the second, third, and base panels 16, 18, 20.

Figure 4:
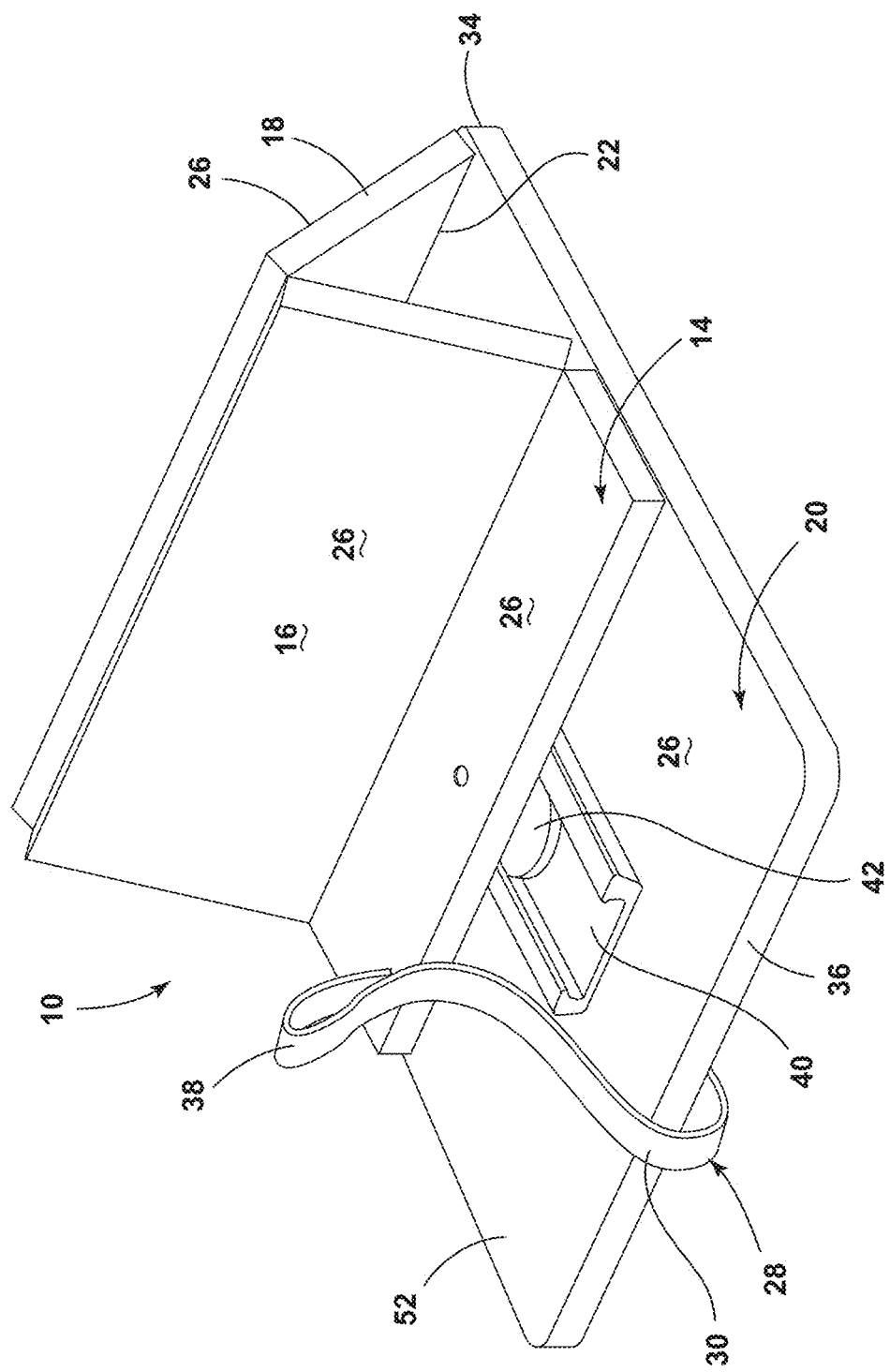
FIG. 4 is a top perspective view of a floor mat, illustrating the first panel in the second position, the second panel in the raised position, and a pull rope that is coupled to the first panel, according to one embodiment.
Figure 5:
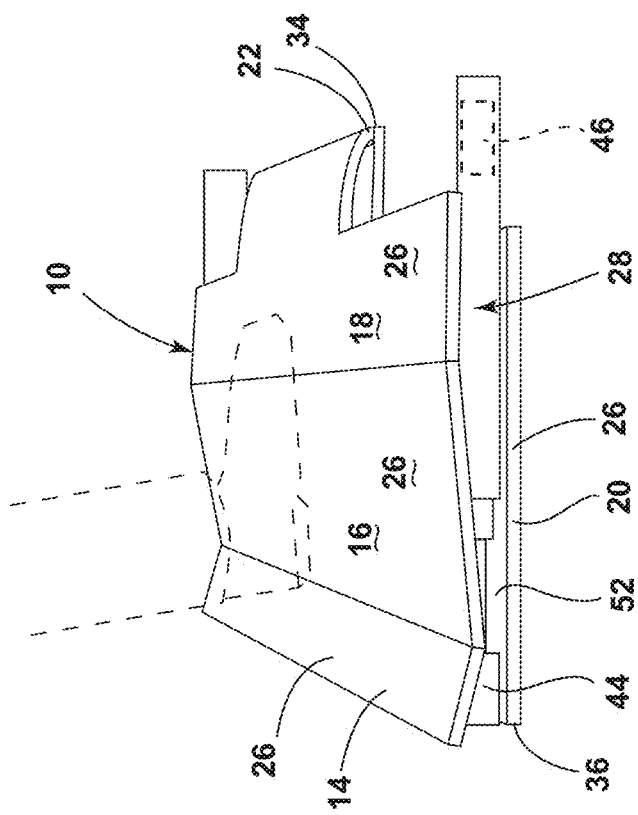
FIG. 5 is a top perspective view of a floor mat, illustrating an actuator coupled to the floor mat and a first panel of the floor mat in a first position, according to one embodiment.

Referring now to FIGS. 2-6, in various embodiments, the first panel 14 is operable between a first position and a second position. In the embodiment illustrated in FIGS. 2 and 3, wherein the floor mat 10 includes the first panel 14, the second panel 16, the third panel 18, and the base panel 20, the first panel 14 is operable between the first position (FIG. 2), wherein the first panel 14 is a first distance from the joint 22 that pivotably couples the third panel 18 and the base panel 20, and the second position (FIG. 3), wherein the first panel 14 is a second distance from the joint 22 that is less than the first distance. In some embodiments, the first panel 14 is operable to move in a vehicle-forward direction from the first position, as illustrated in FIGS. 2 and 5, to the second position, as illustrated in FIGS. 1, 3, 4, and 6. The first panel 14 may move from the first position to the second position in a variety of manners, in various embodiments. For example, in some implementations, the first panel 14 may translate from the first position to the second position, as described further herein.

Referring still to FIGS. 1-6, in various embodiments, movement of the first panel 14 toward the second position causes the second panel 16 of the floor mat 10 to pivot relative to the first panel 14 from a lowered position to a raised position. In the lowered position of the second panel 16, the uppermost portion of the second panel 16 is positioned at a first elevation. In the raised position of the second panel 16, the uppermost portion of the second panel 16 is positioned at a second elevation that is greater than the first elevation. In various embodiments, in the lowered position of the second panel 16, the vehicle-uppermost portion of the second panel 16 is positioned at a first vehicle-elevation. Further, in the raised position of the second panel 16, the vehicle-uppermost portion of the second panel 16 is positioned at a second vehicle-elevation that is greater than the first vehicle-elevation.

Referring still to FIGS. 1-6, in some embodiments, wherein the floor mat 10 includes the first, second, and third panels 14, 16, 18, movement of the first panel 14 toward the second position causes the third panel 18 to pivot relative to the base panel 20 from a lowered position, wherein the uppermost portion of the third panel 18 is positioned at a third elevation, to a raised position, wherein the uppermost portion of the third panel 18 is positioned at a fourth elevation that is greater than the third elevation. In various embodiments, in the lowered position of the third panel 18, the vehicle-uppermost portion of the third panel 18 is positioned at a third vehicle-elevation. In the raised position of the third panel 18, the vehicle-uppermost portion of the third panel 18 is positioned at a fourth vehicle-elevation that is greater than the third vehicle-elevation.

Referring now to FIGS. 2-6, the floor mat 10 can include an actuator 28. In various embodiments, the actuator 28 is coupled to the first panel 14 and is operable to move the first panel 14 between the first and second positions. In some implementations, the actuator 28 is positioned beneath the first panel 14. In some implementations, the actuator 28 is coupled to the base panel 20 of the floor mat 10. Further, the actuator 28 may extend beneath at least a portion of the base panel 20. For example, in the embodiment illustrated in FIGS. 2-4, the actuator 28 is a pull rope 30 that is coupled to an underside 32 of the first panel 14. The pull rope 30 is configured to be pulled in at least one of a vehicle-rearward direction and a vehicle-upward direction to move the first panel 14 vehicle-forward from the first position to the second position. In the embodiment illustrated in FIGS. 2-4, the pull rope 30 is connected with the underside 32 of the first panel 14 and extends around a vehicle-forward edge 34 of the base panel 20, beneath the base panel 20 to a vehicle-rearward edge 36 of the base panel 20, and onward therefrom to a tag end 38 of the pull rope 30. As such, the pull rope 30 is coupled to the first panel 14 and contacts the base panel 20 such that pulling the tag end 38 of the pull rope 30 away from the joint 22 that pivotably couples the third panel 18 and the base panel 20 causes the first panel 14 to move from the first position to the second position.

As illustrated in FIG. 4, the base panel 20 includes a guide track 40 within which a corresponding guide feature 42 that is coupled to the pull rope 30 and/or the first panel 14 is configured to slide. The sliding engagement between the guide track 40 and the guide feature 42 guides translational movement of the first panel 14 from the first position to the second position as the pull rope 30 is pulled by a user.

Figure 6:
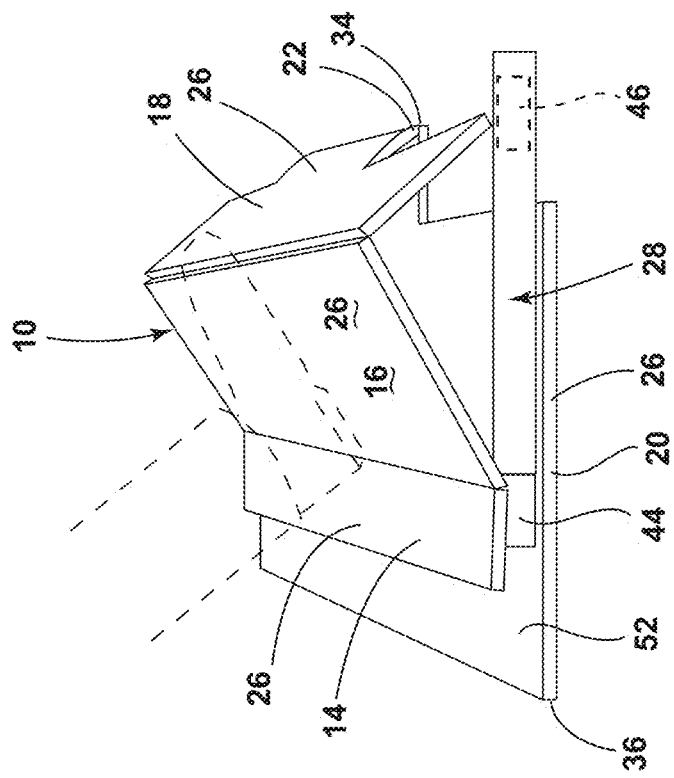
FIG. 6 is a top perspective view of the floor mat, illustrating the actuator and the first panel coupled to the actuator and positioned in a second position, according to one embodiment.

Referring now to FIGS. 5 and 6, in some implementations, the actuator 28 is a linear actuator 44 that is coupled to the first panel 14 and operable to translate the first panel 14 between first and second positions. In the illustrated embodiments, the linear actuator 44 is coupled with an electric motor 46 that propels the linear actuator 44 to move the first panel 14 from the first position, as illustrated in FIG. 5, to the second position, as illustrated in FIG. 6. As illustrated in FIGS. 5 and 6, the linear actuator 44 extends beneath at least a portion of the first panel 14 of the floor mat 10.

Figure 8:
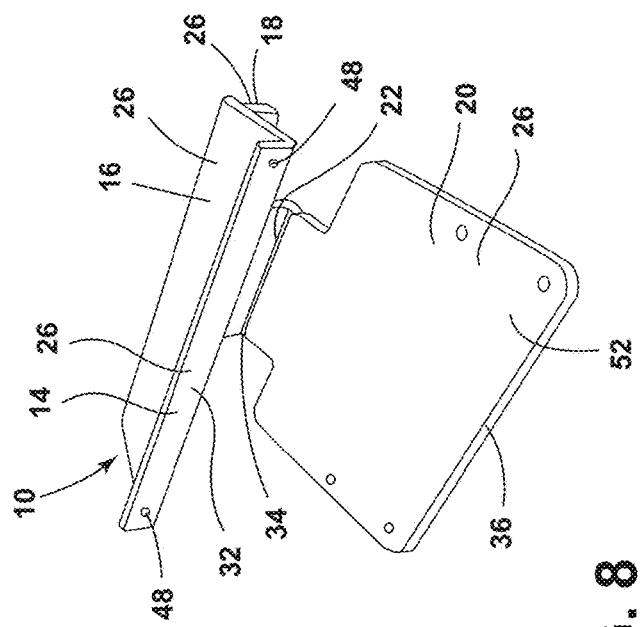
FIG. 8 is a top perspective view of the floor mat, illustrating a base panel of the floor mat, an underside of the first panel of the floor mat, and a retention feature coupled to the underside of the first panel, according to one embodiment.
Figure 7:
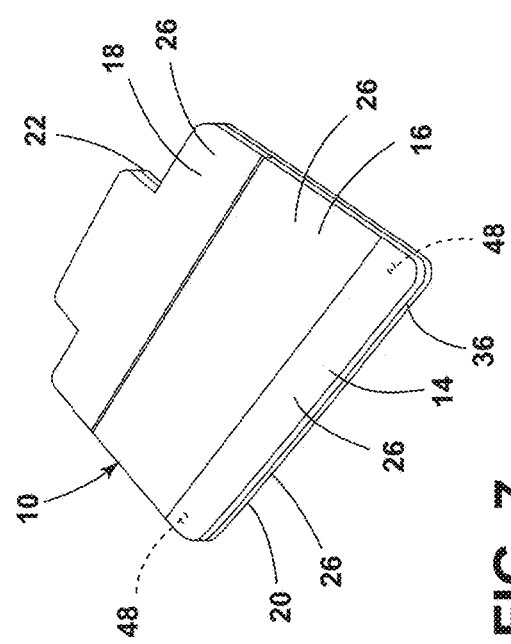
FIG. 7 is a top perspective view of a floor mat, illustrating a first panel of the floor mat in a first position, according to one embodiment.
Figure 9:
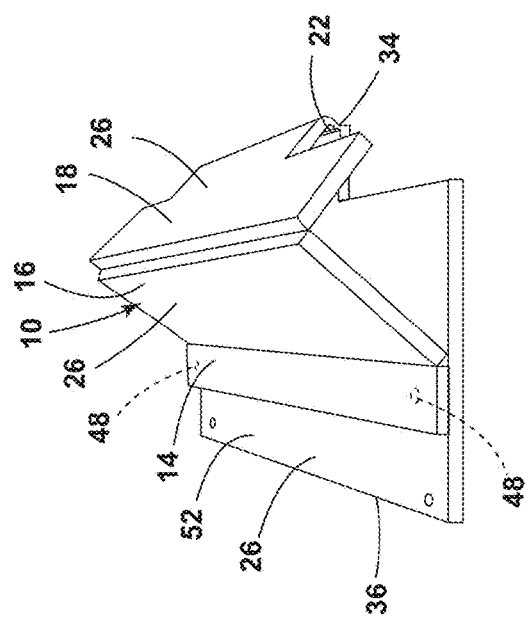
FIG. 9 is a top perspective view of the floor mat, illustrating the first panel in a second position, wherein the retention feature coupled to the first panel is engaged with the base panel of the floor mat to selectively maintain the first panel in a second position, according to one embodiment.

Referring now to FIGS. 7-9, in some embodiments, the floor mat 10 includes a retention feature 48. The retention feature 48 may be configured to engage with a portion of at least one of the floor mat 10 and the vehicle 12 to selectively maintain the first panel 14 in the second position, as illustrated in FIG. 9. In some implementations, the retention feature 48 may further be configured to be engaged with at least a portion of one of the floor mat 10 and the vehicle 12 to selectively maintain the first panel 14 in the first position, as illustrated in FIG. 7. In some embodiments, the retention feature 48 is configured to be engaged with the base panel 20 of the floor mat 10. For example, as illustrated in FIG. 8, the retention feature 48 is coupled to the underside 32 of the first panel 14, such that the retention feature 48 is positioned to engage the base panel 20 of the floor mat 10 in the second position of the first panel 14, as illustrated in FIG. 9. In some embodiments, the retention feature 48 may be configured to be engaged with a portion of the vehicle 12, such as a floor 50 of the vehicle 12. A variety of types of retention features 48 are contemplated. For example, the retention feature 48 may include at least one of a host of features configured to selectively maintain the first panel 14 in the second position that includes, but is not limited to, a snap, a hook and loop fastener, magnets, mating engagement features, tongue and groove fasteners, and/or a combination thereof.

Figure 10:
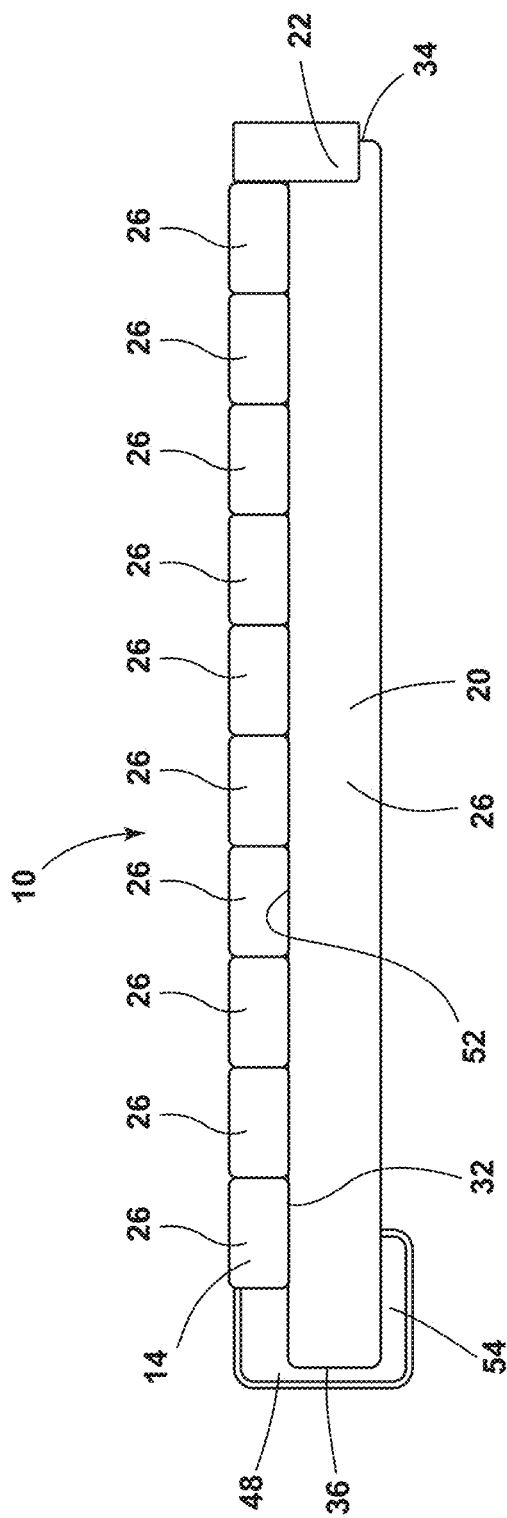
FIG. 10 is a side elevational view of a floor mat, illustrating a plurality of articulated panels that extend along a base panel, and a retention feature that extends from at least one of the plurality of articulated panels along an edge of the base panel and beneath the base panel, according to one embodiment.
Figure 11:
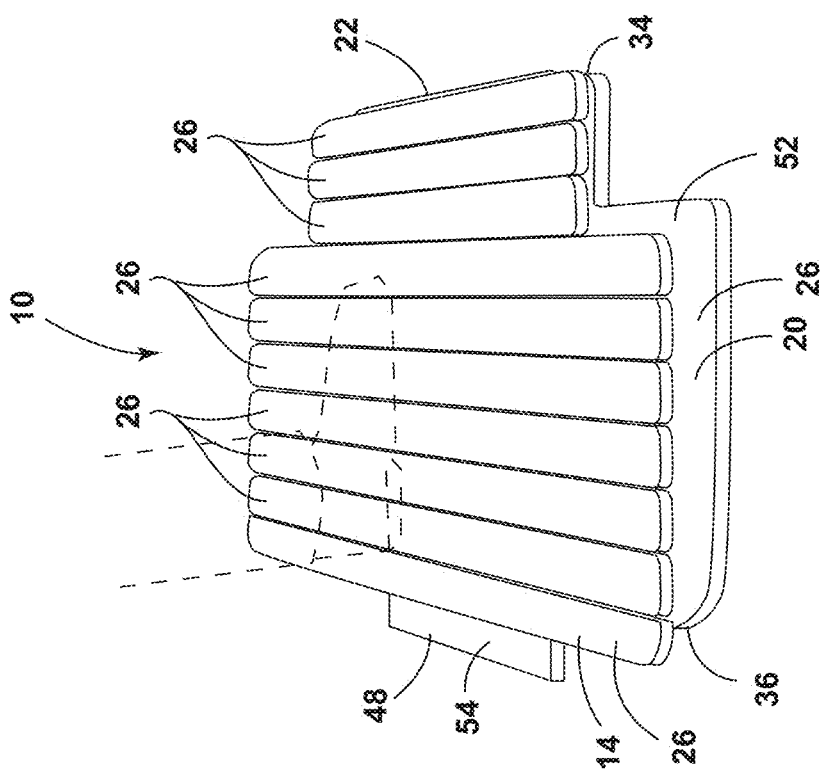
FIG. 11 is a top perspective view of the floor mat, illustrating a first panel of the plurality of panels in a first position, according to one embodiment.
Figure 12:
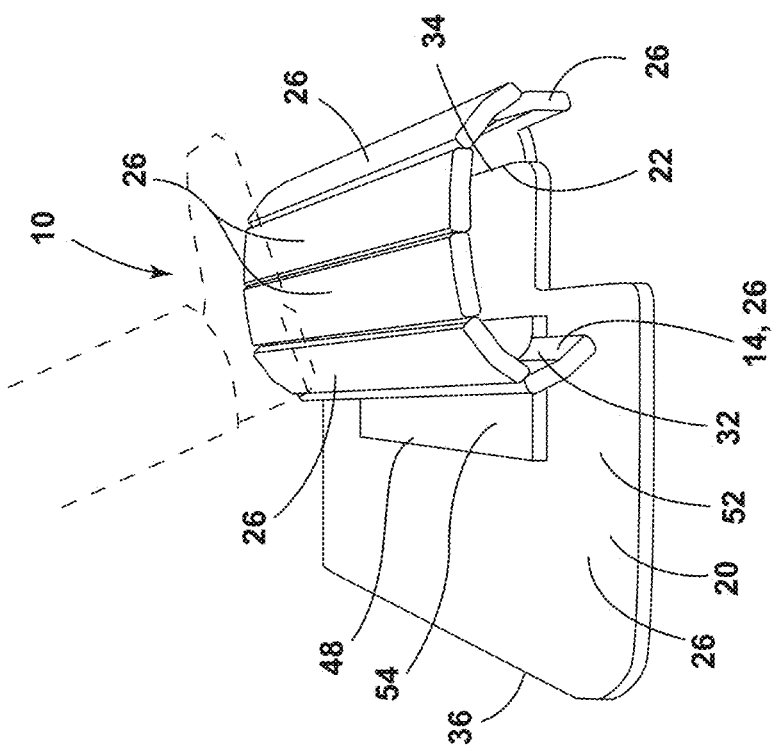
FIG. 12 is a top perspective view of the floor mat, illustrating the first panel in a second position, according to one embodiment.

Referring now to FIGS. 10-12, an embodiment of the floor mat 10 is illustrated. The illustrated floor mat 10 includes a plurality of articulated panels 26, one of which is pivotably coupled to the base panel 20 at the joint 22. Each of the plurality of panels 26 is positioned above the base panel 20, such that the base panel 20 extends beneath the plurality of panels 26, as illustrated in FIG. 10. The floor mat 10 illustrated in FIGS. 10-12 includes a retention feature 48 that is coupled to the first panel 14 of the plurality of panels 26, which is the furthest panel from the joint 22 in the illustrated embodiment. The retention feature 48 illustrated in FIGS. 10-12 extends beneath a portion of the base panel 20 in the first position of the first panel 14, as illustrated in FIGS. 10 and 11. In some embodiments, the retention feature 48 may selectively maintain the first panel 14 in the first position via engagement with the base panel 20, as illustrated in FIGS. 10 and 11. In the second position of the first panel 14 of the plurality of panels 26, the retention feature 48 is engaged with an upper side 52 of the base panel 20, which selectively maintains the first panel 14 in the second position, and a plurality of panels 26 between the first panel 14 and the joint 22 are in raised positions, as illustrated in FIG. 12. In the embodiment illustrated in FIG. 10, the retention feature 48 includes a flap 54 that extends about the vehicle-rearward edge 36 and beneath the base panel 20 in the first position of the first panel 14.

In operation of an exemplary embodiment of the floor mat 10, initially, the floor mat 10 is positioned within a foot well 56 of the vehicle 12, the first panel 14 of the floor mat 10 is in the first position, and the second and third panels 16, 18 are in the lowered positions, respectively, such that the floor mat 10 lies generally in line with the floor 50 of the vehicle 12 beneath the floor mat 10. Next, the user enters the vehicle 12 and prompts actuation of the actuator 28 coupled to the first panel 14 of the floor mat 10. Actuation of the actuator 28 causes the first panel 14 to move from the first position to the second position, the second panel 16 to move from the lowered position to the raised position, and the third panel 18 to move from the lowered position to the raised position. The second panel 16 moves to the raised position by pivoting relative to the first panel 14 and the third panel 18. The third panel 18 moves to the raised position by pivoting relative to the second panel 16 and the base panel 20 at the joint 22. Configured as such, the second panel 16 of the floor mat 10 provides an angled surface for the user to rest his feet.

The present disclosure may provide a variety of advantages. First, the floor mat 10 being operable between a first configuration, in which the panels 26 of the floor mat 10 extend generally parallel to a floor 50 of the vehicle 12, and a second configuration, wherein one or more panels 26 of the floor mat 10 extend upward at an angle relative to the floor 50 to provide a footrest, provides convenient configurability of the vehicle interior 24 for the user. Second, the floor mat 10 including the actuator 28 may allow the user to configure the floor mat 10 as desired without removing the floor mat 10 from the foot well 56 of the vehicle 12.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:
1. A floor mat for a vehicle, comprising:
   a first panel;
   a second panel pivotably coupled to the first panel; and
   an actuator operably coupled to and positioned beneath the first panel, the actuator being operable to move the first panel in a vehicle-forward direction from a first position to a second position, wherein movement of the first panel toward the second position causes the second panel to pivot relative to the first panel from a lowered position, wherein a vehicle-uppermost portion of the second panel is positioned at a first vehicle-elevation, to a raised position, wherein the vehicle-uppermost portion of the second panel is positioned at a second vehicle-elevation that is greater than the first vehicle-elevation.
2. The floor mat of claim 1, wherein the actuator comprises:
   a linear actuator coupled to the first panel and operable to translate the first panel between the first and second positions.
3. The floor mat of claim 1, wherein the actuator comprises:
   a pull rope coupled to the first panel and configured to be pulled in a vehicle-rearward direction to move the first panel from the first position to the second position.
4. The floor mat of claim 1, further comprising:
   a base panel positioned beneath the first and second panels, wherein the actuator is coupled to the base panel.
5. The floor mat of claim 4, further comprising:
   a third panel pivotably coupled to the second panel and pivotably coupled to the base panel.
6. The floor mat of claim 5, wherein movement of the first panel toward the second position causes the third panel to pivot relative to the base panel from a lowered position, wherein a vehicle-uppermost portion of the third panel is positioned at a third vehicle-elevation, to a raised position, wherein the vehicle-uppermost portion of the third panel is positioned at a fourth vehicle-elevation that is greater than the third vehicle-elevation.
7. The floor mat of claim 5, wherein the first panel is smaller than each of the second, third, and base panels.
8. A floor mat for a vehicle, comprising:
   a first panel having an underside;
   a retention feature coupled to the underside of the first panel; and
   a second panel pivotably coupled to the first panel, wherein the first panel is operable between a first position and a second position vehicle-forward of the first position, and wherein movement of the first panel toward the second position causes the second panel to pivot relative to the first panel from a lowered position, wherein a vehicle-uppermost portion of the second panel is positioned at a first vehicle-elevation, to a raised position, wherein the vehicle-uppermost portion of the second panel is positioned at a second vehicle-elevation that is greater than the first vehicle-elevation, and wherein the retention feature is configured to be engaged with a portion of at least one of the floor mat and the vehicle to selectively maintain the first panel in the second position.

9. The floor mat of claim 8, wherein the retention feature is configured to be engaged with a portion of the vehicle to selectively maintain the first panel in the second position.

10. The floor mat of claim 8, further comprising:
a base panel positioned beneath the first and second panels, wherein the retention feature is configured to be engaged with the base panel to selectively maintain the first panel in the second position.

11. The floor mat of claim 10, further comprising:
a third panel pivotably coupled to the second panel and pivotably coupled to the base panel.

12. The floor mat of claim 11, wherein movement of the first panel toward the second position causes the third panel to pivot relative to the base panel from a lowered position, wherein a vehicle-uppermost portion of the third panel is positioned at a third vehicle-elevation, to a raised position, wherein the vehicle-uppermost portion of the third panel is positioned at a fourth vehicle-elevation that is greater than the third vehicle-elevation.

13. The floor mat of claim 8, further comprising:
an actuator operably coupled to and positioned beneath the first panel, the actuator being operable to move the first panel in the vehicle-forward direction from the first position to the second position.

14. A floor mat for a vehicle, comprising:
a first panel;
a second panel pivotably coupled to the first panel;
a third panel pivotably coupled to the second panel; and
a base panel extending beneath the first, second, and third panels and being pivotably coupled to the third panel at a joint, the first panel being operable between a first position, wherein the first panel is a first distance from the joint, and a second position, wherein the first panel is a second distance from the joint that is less than the first distance, and wherein movement of the first panel toward the second position causes the second panel to pivot relative to the first panel from a lowered position, wherein an uppermost portion of the second panel is positioned at a first elevation, to a raised position, wherein the uppermost portion of the second panel is positioned at a second elevation that is greater than the first elevation.

15. The floor mat of claim 14, wherein movement of the first panel toward the second position causes the third panel to pivot relative to the base panel from a lowered position, wherein an uppermost portion of the third panel is positioned at a third elevation, to a raised position, wherein the uppermost portion of the third panel is positioned at a fourth elevation that is greater than the third elevation.

16. The floor mat of claim 14, further comprising:
a retention feature coupled to an underside of the first panel and operable to be engaged with the base panel to maintain the first panel in the second position.

17. The floor mat of claim 14, further comprising:
an actuator operably coupled to and positioned beneath the first panel, the actuator being operable to move the first panel from the first position to the second position.

18. The floor mat of claim 17, wherein the actuator extends beneath at least a portion of the base panel.

19. The floor mat of claim 17, wherein the actuator comprises:
a pull rope that is coupled to the first panel and contacts the base panel such that pulling a tag end of the pull rope away from the joint causes the first panel to move from the first position to the second position.

20. The floor mat of claim 17, wherein the actuator comprises:
a linear actuator that is coupled to a motor and configured to translate the first panel from the first position to the second position.

\* \* \* \* \*